(12) United States Patent
Lee et al.

(10) Patent No.: US 11,847,717 B2
(45) Date of Patent: Dec. 19, 2023

(54) BIDIRECTIONALLY ASSOCIATIVE DUAL AUTOENCODER AND IMAGE TRANSLATION METHOD USING THE SAME

(71) Applicant: RESEARCH & BUSINESS FOUNDATION SUNGKYUNKWAN UNIVERSITY, Suwon-si (KR)

(72) Inventors: Sukhan Lee, Yongin-si (KR); Islam Naeem Ui, Suwon-si (KR); Soojin Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 330 days.

(21) Appl. No.: 17/186,309

(22) Filed: Feb. 26, 2021

(65) Prior Publication Data
US 2021/0272325 A1 Sep. 2, 2021

(30) Foreign Application Priority Data

Feb. 27, 2020 (KR) .......................... 10-2020-0024633

(51) Int. Cl.
*G06T 1/00* (2006.01)
*G06T 9/00* (2006.01)
(Continued)

(52) U.S. Cl.
CPC .............. *G06T 1/00* (2013.01); *G06N 3/045* (2023.01); *G06N 3/088* (2013.01); *G06T 3/20* (2013.01);
(Continued)

(58) Field of Classification Search
CPC .. G06T 1/00; G06T 3/20; G06T 9/002; G06T 5/002; G06T 11/40; G06T 2207/20084;
(Continued)

(56) References Cited

U.S. PATENT DOCUMENTS

2019/0370616 A1* 12/2019 Eser .................. G06F 18/21355
2021/0019541 A1* 1/2021 Wang ................... G06V 40/172

FOREIGN PATENT DOCUMENTS

KR 10-2018-0073704 A 7/2018

OTHER PUBLICATIONS

Cross Domain Image Transformation, Islam, 2018 (Year: 2018).*
(Continued)

*Primary Examiner* — Jianxun Yang
(74) *Attorney, Agent, or Firm* — NSIP Law

(57) ABSTRACT

A dual autoencoder includes a first domain encoder for mapping a first domain image into a first latent space, a first domain decoder for reconstructing the first domain image, a second domain encoder for mapping a second domain image into a second latent space, a second domain decoder for reconstructing the second domain image; and a latent space association network for defining a cross-domain relationship between the first domain and the second domain. An image translation method using a dual encoder, may include: taking a first domain image as an input; determining an output condition; if the output condition is the same domain, reconstructing the first domain image by a first domain encoder and a first domain decoder; and if the output condition is the cross domain, reconstructing a second domain image by the first domain encoder, a latent space association network, and a second domain decoder.

15 Claims, 12 Drawing Sheets

(51) Int. Cl.
  *G06N 3/088* (2023.01)
  *G06T 3/20* (2006.01)
  *G06N 3/045* (2023.01)
  *G06V 10/75* (2022.01)
  *G06V 10/764* (2022.01)
  *G06V 10/82* (2022.01)

(52) U.S. Cl.
  CPC .............. *G06T 9/002* (2013.01); *G06V 10/75* (2022.01); *G06V 10/764* (2022.01); *G06V 10/82* (2022.01)

(58) Field of Classification Search
  CPC ........ G06N 3/045; G06N 3/088; G06N 3/047; G06N 3/04; G06N 3/08; G06V 10/75; G06V 10/764; G06V 10/82
  See application file for complete search history.

(56) References Cited

OTHER PUBLICATIONS

Islam, Naeem Ui, et al. "Cross domain image transformation using effective latent space association." *International Conference on Intelligent Autonomous Systems.* Springer, Cham, 2018. pp. 706-716.

Gonzalez-Garcia, Abelet al., "Image-to-image translation for cross-domain disentanglement," *arXiv preprint arXiv:1805.09730*, 2018 (pp. 1-12).

\* cited by examiner

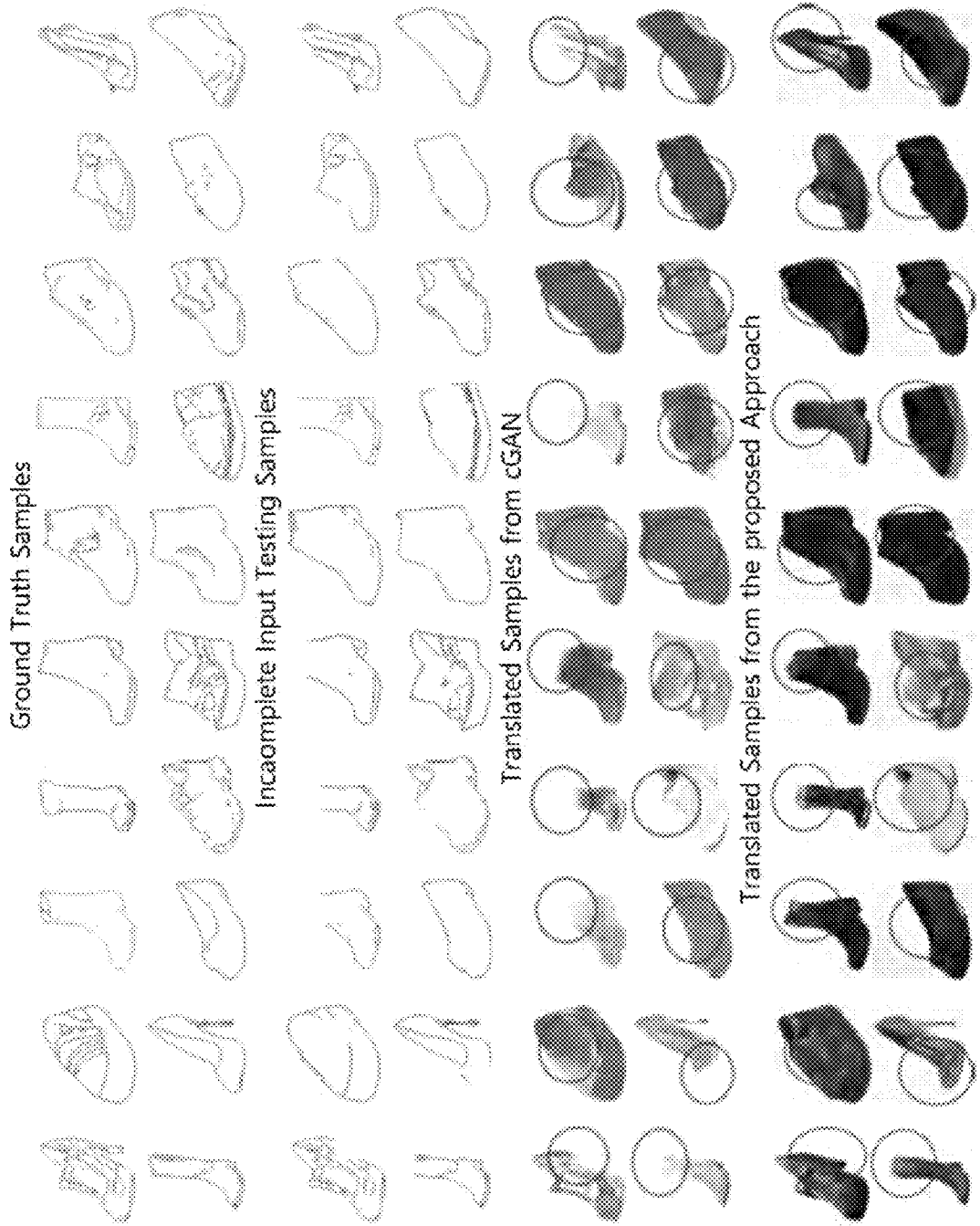

FIG.8A

| UT-Zap50K + Edge Reqresentation : No testing data distortion ||
|---|---|
| Approaches | MSE |
| cGAN | 144.5 |
| BA-DualAE(PRESENT DISCLOSURE) | 117.6 |

FIG.8B

| Approaches | Low Level of occlusion | High Level of occlusion |
|---|---|---|
| cGAN | 101.222 | 127.521 |
| BA-DualAE (PRESENT DISCLOSURE) | 76.202 | 109.302 |

FIG.8C

| Approaches | MSE | SSIM |
|---|---|---|
| cGAN | 30.378 | 0.605 |
| AE | 26.769 | 0.621 |
| BA-DualAE (PRESENT DISCLOSURE) | 22.54 | 0.644 |

BIDIRECTIONALLY ASSOCIATIVE DUAL AUTOENCODER AND IMAGE TRANSLATION METHOD USING THE SAME

CROSS-REFERENCE TO RELATED APPLICATIONS

This application is based on and claims priority from Korean Patent Application No. 10-2020-0024633 filed on Feb. 27, 2020, the disclosure of which is incorporated herein in its entirety by reference for all purposes.

TECHNICAL FIELD

The present disclosure relates to a bidirectionally associative dual autoencoder and an image translation method using the same.

BACKGROUND

Image translation has implications for a broad range of image processing tasks, including image coloring, styling, de-noising, modification, and completion. In particular, a deep neural network approach to image translation incorporates learning a general association embedded in pairwise data that can affect data interpretation and enhancement.

Conventional deep neural network-based image-to-image translation methods include an autoencoder and generative adversarial network (GAN) approach, a conditional GAN (cGAN) approach, a DualGAN approach, and so on.

The autoencoder and GAN approach includes an autoencoder, a variational autoencoder, a GAN, a pixel-convolutional neural network (pixel-CNN), etc., in which the distribution of input images is learned to generate realistic images.

The cGAN approach is a method in which a specific condition is added in the GAN method, which addresses the problem of performance degradation in real images after training on synthetic images. In this approach, a synthetic image is translated into a real image by minimizing the Manhattan distance between the synthetic image and the real image, together with the adversarial loss.

The DualGAN approach allows the network to be not only bidirectional in image translation but also trainable in an unsupervised way without the need for explicit correspondences, as well as allowing for bidirectional image translation, by employing a dual configuration of GAN.

However, the conventional techniques have shown limitations in generality. That is, they suffer from a sudden loss of accuracy under conditions of incomplete or corrupted images unless they are trained explicitly. Another problem with the conventional techniques is that the incomplete or corrupted part of the input image is undesirably incorporated into the corresponding part of the output image.

PRIOR ART DOCUMENTS (Non-Patent Document 1) Abel Gonzales-Garcia, Joost van de Weijer, and Yoshua Bengio. Image-to-image translation for cross-domain disentanglement. NIPS'18: Proceedings of the 32nd International Conference on Neural Information Processing Systems. Pages 1294-1305. December 2018.

SUMMARY

In view of the above, the present disclosure provides a dual autoencoder that provides accuracy and generality in image translation and generates a complete and uncorrupted output image even from an incomplete or corrupted input image, and an image translation method using the same.

Furthermore, the present disclosure provides an image translation integration framework capable of performing image translation, completion, and denoising with less computational complexity and performing direct image completion with no iterative search.

The aspects of the present disclosure are not limited to this, and may vary extensively without departing from the spirit and scope of the present disclosure.

In accordance with a first aspect of the present disclosure, there is provided a dual autoencoder including: a first domain encoder for mapping a first domain image into a first latent space; a first domain decoder for reconstructing the first domain image; a second domain encoder for mapping a second domain image into a second latent space; a second domain decoder for reconstructing the second domain image; and a latent space association network for defining a cross-domain relationship between the first domain and the second domain.

The latent space association network may define the cross-domain relationship by mapping between the first latent space and the second latent space.

The first domain decoder may use different latent spaces as an input according to an output condition, wherein, if the output condition is the same domain, the first domain decoder takes the first latent space as an input, and, if the output condition is the cross domain, the first domain decoder takes the output of the latent space association network as an input.

The second domain decoder may use different latent spaces as an input according to an output condition, wherein, if the output condition is the same domain, the second domain decoder takes the second latent space as an input, and, if the output condition is the cross domain, the second domain decoder takes the output of the latent space association network as an input.

The first domain encoder and the first domain decoder may be trained using the first domain image, the second domain encoder and the second domain decoder may be trained using the second domain image, and the latent space association network may be trained after the first domain encoder, the first domain decoder, the second domain encoder, and the second domain decoder are trained.

The latent space association network may be trained in a way that reduces L2 regression losses between a latent distribution of ground truth and an output of the latent space association network, wherein the L2 regression losses may be given by $$L_{LSAN} = q_1(z_1|y_1) - LSAN(q_2(z_2|y_2)) + q_2(z_2|y_2) - LSAN(q_1(z_1|y_1)),$$

where q1 (z1|y1) and q2(z2|y2) may be outputs of a first autoencoder and a second autoencoder, respectively, and LSAN may be an association between the first latent space and the second latent space.

The first domain encoder and the second domain encoder may include a convolutional layer and a fully connected layer.

The first domain decoder and the second domain decoder may include a deconvolutional layer and a fully connected layer.

The latent space association network may have a structure of a fully connected association network.

In accordance with a second aspect of the present disclosure, there is provided an image translation method using a dual encoder, including: taking a first domain image as an input; determining an output condition; if the output condition is the same domain, reconstructing the first domain image by a first domain encoder and a first domain decoder; and if the output condition is the cross domain, reconstructing a second domain image by the first domain encoder, a latent space association network, and a second domain decoder.

The reconstructing of the first domain image may include: mapping the first domain image into a first latent space by the first domain encoder; and reconstructing the first domain image using the first latent space by the first domain decoder.

The reconstructing of the first domain image into a second domain image may include: mapping the first domain image into a first latent space by the first domain encoder; transforming the first latent space to the second latent space by the latent space association network; and reconstructing the second domain image using the second latent space by the second domain decoder.

The latent space association network may define the cross-domain relationship by mapping between the first latent space and the second latent space.

The first domain encoder and the first domain decoder may be trained using the first domain image, the second domain encoder and the second domain decoder may be trained using the second domain image, and the latent space association network may be trained after the first domain encoder, the first domain decoder, the second domain encoder, and the second domain decoder are trained.

The latent space association network may be trained in a way that reduces L2 regression losses between a latent distribution of ground truth and an output of the latent space association network, wherein the L2 regression losses may be given by $$L_{LSAN} = q_1(z_1|y_1) - LSAN(q_2(z_2|y_2)) + q_2(z_2|y_2) - LSAN(q_1(z_1|y_1)),$$

where q1 (z1|y1) and q2(z2|y2) may be outputs of the first autoencoder and second autoencoder, respectively, and LSAN may be an association between the first latent space and the second latent space.

The first domain encoder and the second domain encoder may include a convolutional layer and a fully connected layer.

The first domain decoder and the second domain decoder may include a deconvolutional layer and a fully connected layer.

The latent space association network may have a fully connected association network structure.

In accordance with a third aspect of the present disclosure, there is provided a computer-readable recording medium storing a computer program, that performs an image translation method using a dual encoder, the computer program comprising: an instruction for taking a first domain image as an input; an instruction for determining an output condition; an instruction for reconstructing the first domain image by a first domain encoder and a first domain decoder, if the output condition is the same domain; and an instruction for reconstructing the second domain image by the first domain encoder, a latent space association network, and a second domain decoder.

The disclosed technology may have the following effects. However, it does not mean that a specific embodiment embraces all the effects suggested in the present disclosure or embraces only such effects, and therefore, it should be understood that the right scope of the disclosed technology is not limited thereto.

The dual autoencoder and the image translation method using the same according to the above-described embodiments of the present disclosure provide accuracy and generality in image translation because latent spaces of two autoencoders are closely connected by a bidirectional recurrent network, and can generate a complete and uncorrupted output image even from an incomplete or corrupted input image.

Furthermore, image translation, completion, and denoising can be performed with less computational complexity, and image completion can be performed directly without repetitive retrieval.

BRIEF DESCRIPTION OF THE DRAWINGS

FIGS. 4A and 4B are comparative experimental results of the performance of image translation of incomplete images, when dual the autoencoder and the image translation method using the same according to the embodiment of the present disclosure and the cGAN approach are applied.

FIGS. 8A to 8C are tables showing a quantitative comparison of performance between the dual autoencoder according the embodiment of the present disclosure and the conventional approaches.

DETAILED DESCRIPTION

Figure 1:
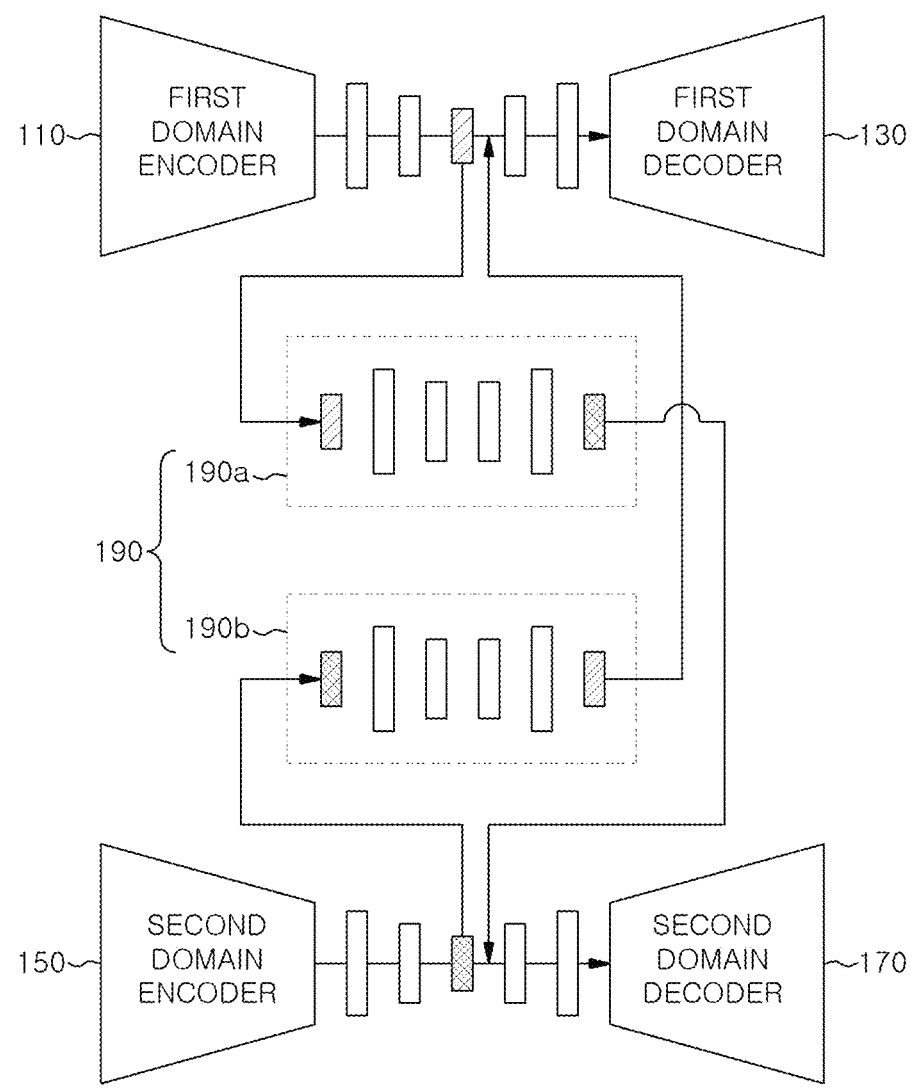
FIG. 1 is a block diagram showing a structure of a dual autoencoder according to an embodiment of the present disclosure.

The present disclosure may make various changes and include various embodiments, and specific embodiments will be illustrated in the drawings and described in the detailed description.

However, the present disclosure is not limited to a specific embodiment, and it should be understood that the present disclosure includes all changes, equivalents, or substitutes included in the spirit and scope thereof.

Terms including ordinal numbers, such as first and second, may be used for describing various elements, but the corresponding elements are not limited by these terms. These terms are only used for the purpose of distinguishing one element from another element. For example, without departing from the scope of the present disclosure, a first element may be referred to as a second element, and similarly, the second element may be referred to as the first element.

When an element is referred to as being 'connected' to or 'accessed' by another element, it should be understood that the element may be directly connected to or accessed by the other element, but that other elements may exist in the middle. On the contrary, when an element is referred to as being 'directly connected' to or 'directly accessed' by another element, it should be understood that other elements may not exist in the middle.

The terms used in the present disclosure are only used for describing specific embodiments, and are not intended to limit the present disclosure. Singular expressions include plural expressions unless the context clearly indicates otherwise. In the present specification, it is to be understood that the terms such as "including" or "having," etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless otherwise defined herein, all terms used in the present invention including technical or scientific terms have the same meanings as terms that are generally understood by those skilled in the art related to the field of the present invention. The same terms as those that are defined in a general dictionary should be understood to have the same meanings as contextual meanings of the related art. Unless the terms are explicitly defined in the present invention, the terms should not be interpreted with ideal or excessively formal meanings.

Hereinafter, exemplary embodiments of the present disclosure will be described clearly and in detail so that those skilled in the art can easily carry out the present disclosure.

FIG. 1 is a block diagram showing a structure of a dual autoencoder according to an embodiment of the present disclosure.

Referring to FIG. 1, a dual autoencoder according to the embodiment of the present disclosure includes a first domain encoder 110, a first domain decoder 130, a second domain encoder 150, a second domain decoder 170, and a latent space association network (LSAN) 190. The first domain encoder 110 and the first domain decoder 130 form one autoencoder (hereinafter, 'first autoencoder'), and the second domain encoder 150 and the second domain decoder 170 form another autoencoder (hereinafter, 'second autoencoder'). Moreover, the LSAN 190 may include a first LSAN 190a and a second LSAN 190b.

The first domain encoder 110 translates a first domain image into a first latent space. For example, the first domain image may be a sketched image or a partially occluded image. The first domain encoder 110 may include a convolutional layer and a fully connected layer.

The first domain decoder 130 takes the first latent space generated by the first domain encoder 110 or the output of the second LSAN 190b as an input and reconstructs the first domain image, according to an output condition. The output condition as used herein is either the same domain or the cross domain. That is, if the output condition is the same domain, the first domain decoder 130 takes the first latent space generated by the first domain encoder 110 as an input, and, if the output condition is the cross domain, the first domain decoder 130 takes the output of the second LSAN 190b as an input. The first domain decoder 130 may have a structure exactly opposite to that of the first domain encoder 110. That is, the first domain decoder 130 may include a deconvolutional layer and a fully connected layer.

The second domain encoder 150 maps a second domain image into a second latent space. For example, the second domain image is an image with a different domain to that of the first domain image, which may be a colored image or completed image, corresponding to the first domain image in the above example. The second domain encoder 150 may include a convolutional layer and a fully connected layer.

The second domain decoder 170 takes the second latent space generated by the second domain encoder 150 or the output of the first LSAN 190a as an input and reconstructs the second domain image, according to an output condition. That is, if the output condition is the same domain, the second domain decoder 170 takes the second latent space generated by the second domain encoder 150 as an input, and, if the output condition is the cross domain, the second domain decoder 170 takes the output of the first LSAN 190a as an input. The second domain decoder 170 may have a structure exactly opposite that of the second domain encoder 150.

The first LSAN 190a and the second LSAN 190b define a cross-domain relationship between the first domain and the second domain. That is, the first LSAN 190a transforms the first latent space to the second latent space, and the second LSAN 190b transforms the second latent space back to the first latent space. The first LSAN 190a and the second LSAN 190b are shown differently for convenience of explanation, but they may be a single network and referred to as the LSAN 190. The LSAN 190 associates the marginal distribution of the first domain projected by the first autoencoder and the marginal distribution of the second domain projected by the second autoencoder, in order to build a relationship between the first autoencoder and the second autoencoder. The LSAN 190 may have a fully connected association network structure.

The learning of the above-described dual autoencoder is implemented in two phases.

First of all, the first autoencoder and the second autoencoder are separately trained on the same domain translation. An encoder takes each domain image as an input and maps it into a latent space, and a decoder takes the latent space as an input and reconstructs the same domain image. Here, L2 regression losses of the input domain image and the reconstructed image of the same domain may be used as the loss function.

Next, the LSAN 190 is trained. In this case, the training is done in a way that reduces the losses between the latent distribution of ground truth and the output of the LSAN 190. L2 regression losses may be used as the loss function. The combined loss of the LSAN 190 may be given by Equation 1:

$$L_{LSAN} = q_1(z_1|y_1) - LSAN(q_2(z_2|y_2)) + q_2(z_2|y_2) - LSAN(q_1(z_1|y_1)),$$

where q1 (z1|y1) and q2(z2|y2) are the outputs of the first autoencoder and second autoencoder, respectively, and LSAN is the association between two latent representations of the two domains.

Figure 2:
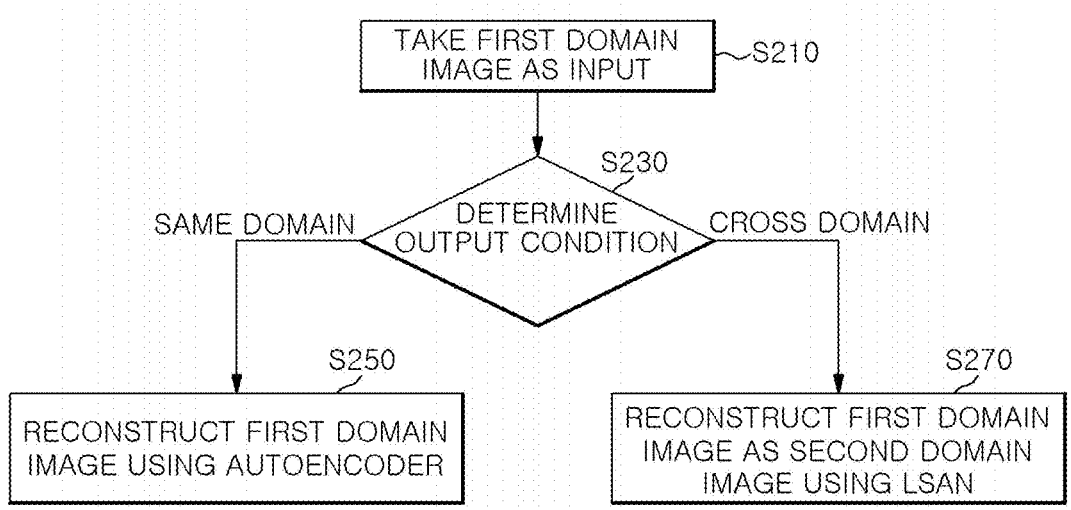
FIG. 2 is a sequence chart of an image translation method using the dual autoencoder according to another embodiment of the present disclosure.

FIG. 2 is a sequence chart of an image translation method using a dual autoencoder according to another embodiment of the present disclosure.

Referring to FIG. 2, the step S210 is a step of taking a first domain image as an input.

The step S230 is a step of determining an output condition. Here, the output condition is either the same domain or the cross domain. That is, if the output condition is the same domain, the first domain image is reconstructed as is, and, if the output condition is the cross domain, the first domain image is reconstructed as a second domain image.

The step S250 is a step of reconstructing the first domain image using an autoencoder if the output condition is the same domain. That is, if the output condition is the same domain, the first domain encoder 110 takes the first domain image as an input and maps it into a first latent space, and the first domain decoder 130 maps the first latent space to a reconstruction of the first domain image.

The step S270 is a step of reconstructing the first domain image as a second domain image using the LSAN 190 if the output condition is the cross domain. That is, if the output condition is the cross domain, the first domain encoder 110 takes the first domain image as an input and maps it into a first latent space, the LSAN 190 transforms the first latent space to a second latent space, and the second domain decoder 170 maps the second latent space outputted from the LSAN 190 to a reconstruction of the second domain image.

Hereinafter, dual autoencoders according to embodiments of the present disclosure and experimental results of image translations using the same, compared with a conventional approach, will be described.

The experiment was conducted in two aspects. Firstly, the performance of a dual autoencoder was assessed in terms of the bidirectional translation of images from single domain to cross domain and vice versa. This was performed by using natural images of a UT-Zap50K dataset and a handbag dataset and their corresponding sketches. The experimental results are shown in FIGS. 3A to 5. Secondly, the performance of direct image completion for partially occluded images was assessed for the evaluation of generality. The experimental results are shown in FIGS. 6A to 7B.

Figure 3A:
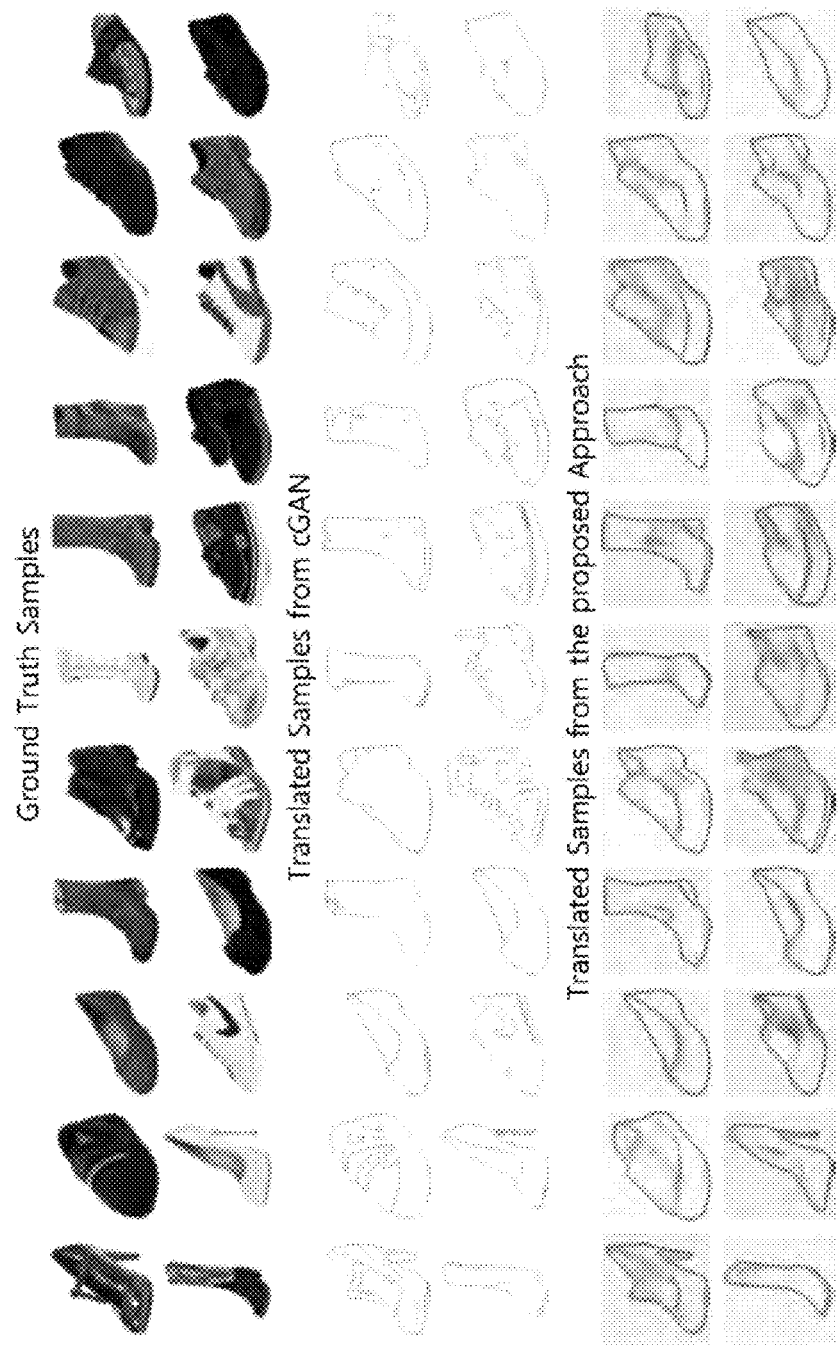
FIGS. 3A and 3B are comparative experimental results of the performance of image translation of complete and uncorrupted images, when the dual autoencoder and the image translation method using the same according to the embodiment of the present disclosure and the cGAN approach are applied.
Figure 3B:
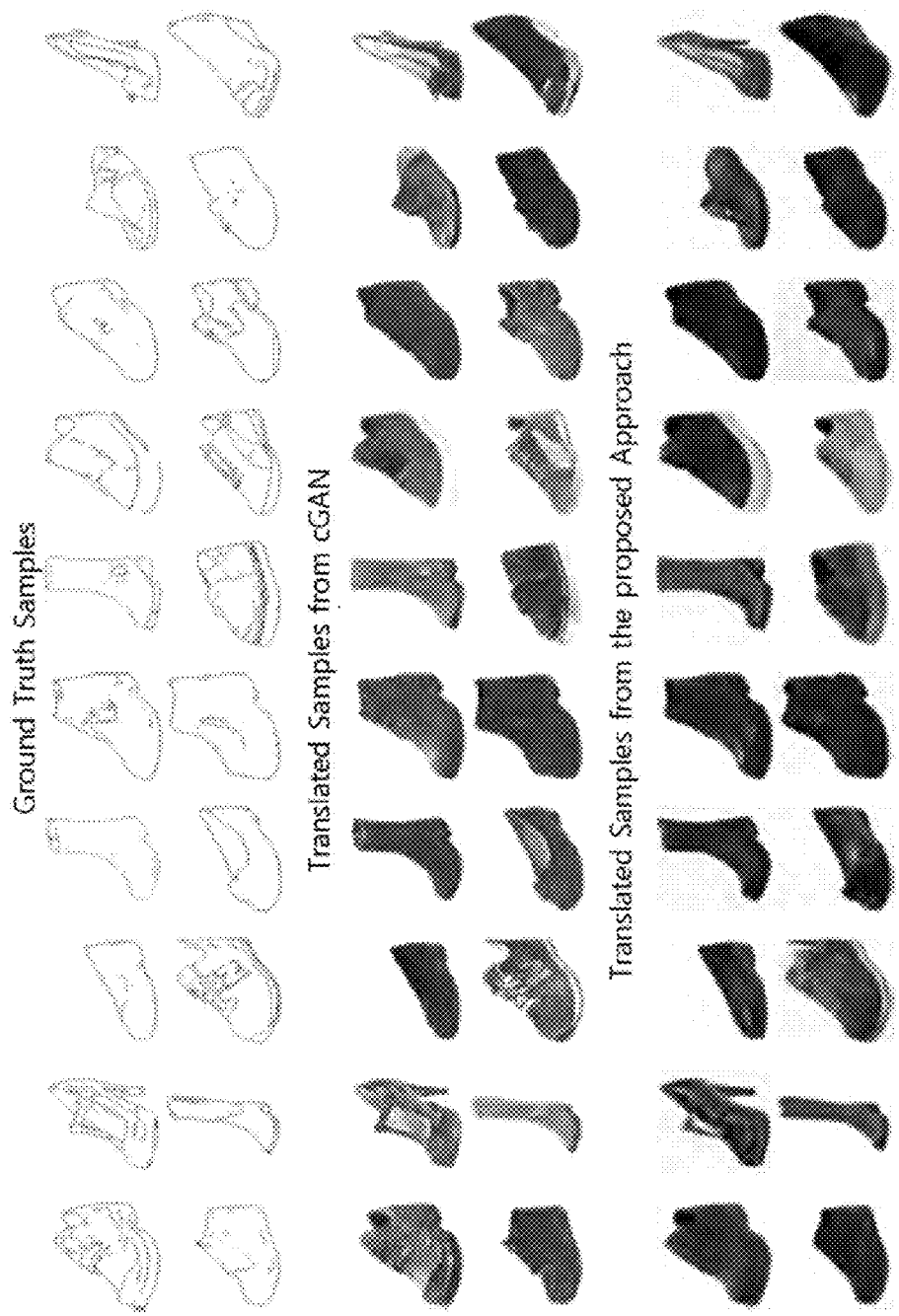

FIGS. 3A and 3B are comparative experimental results of the performance of image translation of complete and uncorrupted images, when the dual autoencoder and the image translation method using the same according to the embodiment of the present disclosure and the cGAN approach are applied.

FIG. 3A shows the results of cross-domain translations of real images into sketches. FIG. 3B shows the results of cross-domain translations of sketches into real images. The ground truth was used to assess the accuracy of the image translations. The dual autoencoder and the image translation method using the same according to the embodiment of the present disclosure allow for bidirectional image translation without additional learning and produce high-accuracy image translation results. The cGAN approach also produces high-accuracy image translation results. One difference between the two is that: the cGAN approach prefers to maintain the fine details of the input images, whereas the dual autoencoders and image translation methods according to embodiments of the present disclosure prefer to maintain the global features of the input images. As mentioned previously, this clearly indicates that the dual autoencoders and image translation methods according to the present disclosure focus much more on generality while keeping accuracy high.

Figure 4A:
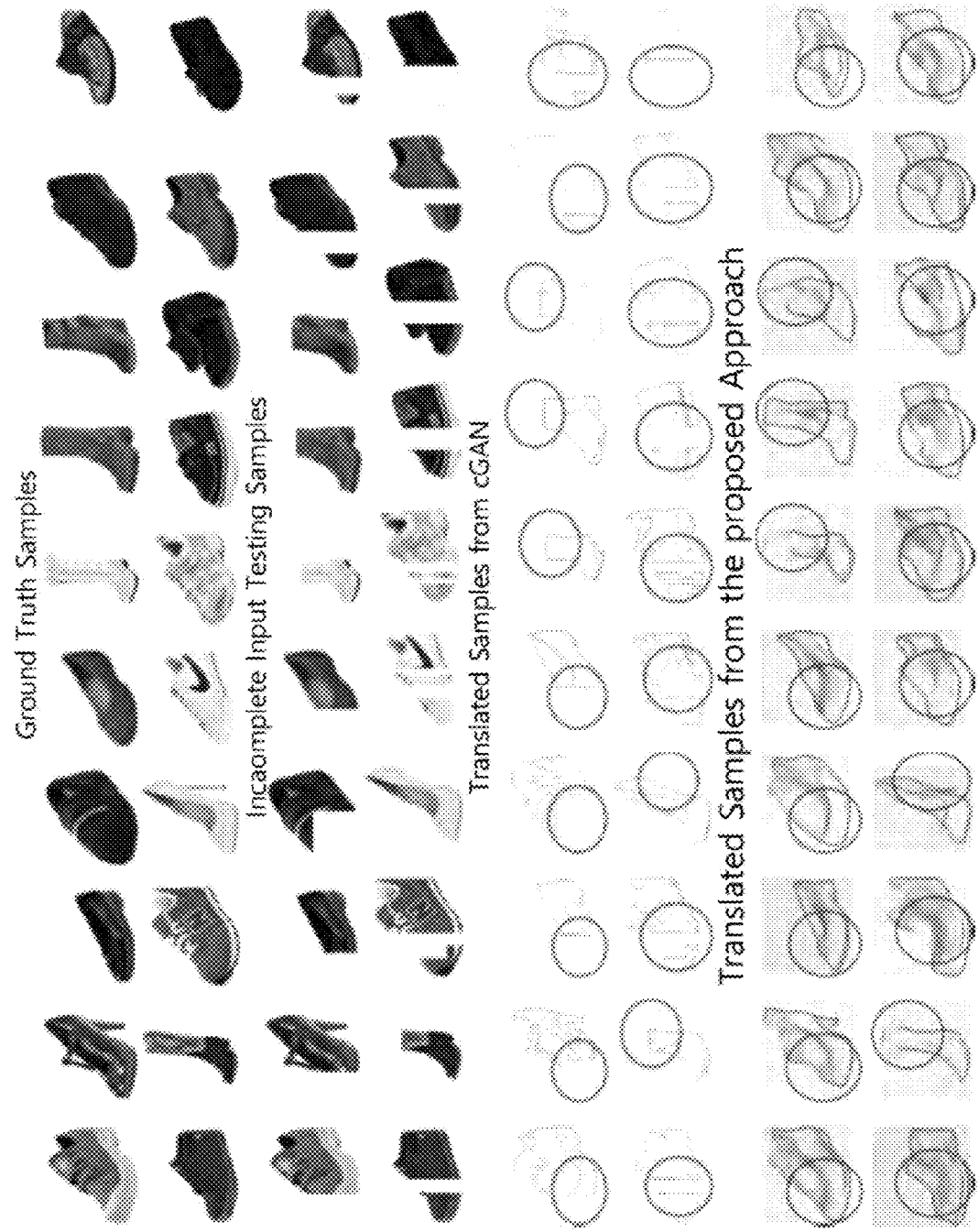

FIGS. 4A and 4B are comparative experimental results of the performance of image translation of incomplete images, when the dual autoencoder and the image translation method using the same according to the embodiment of the present disclosure and the cGAN approach are applied.

FIG. 4A shows the results of cross-domain translations of real images into sketches. FIG. 4B shows the results of cross-domain translations of sketches into real images. The ground truth was used to assess the accuracy of the image translations. In this experiment, the real images (in the first and second rows of FIG. 4A) and the sketches (in the first and second rows of FIG. 4B) are partially occluded at random locations (in the third and fourth rows of FIGS. 4A and 4B, respectively) and used as input images. A comparison of reconstructed images shows that the dual autoencoders and image translation methods according to the present disclosure allow for reconstructing higher-quality images than the cGAN approach. It can be seen that the cGAN approach (the fifth and sixth rows of FIGS. 4A and 4B) does not perform image translations properly on the missing parts in the input images and the corresponding parts in the reconstructed images are empty. In contrast, it can been seen that the dual autoencoders and image translation methods according to the present disclosure (the seventh and eighth rows of FIGS. 4A and 4B) reconstruct complete images by performing image translations of the missing parts in the input images.

Figure 5:
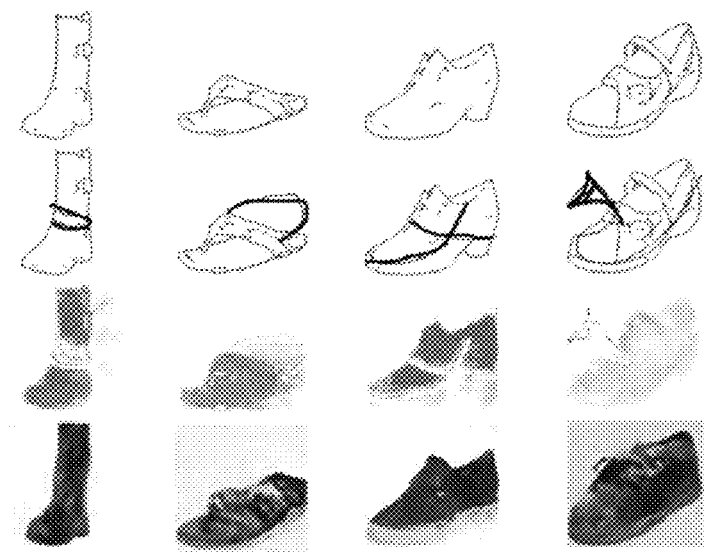
FIG. 5 shows comparative experimental results of the performance of image translation of corrupted images, when the dual autoencoder and the image translation method using the same according to the embodiment of the present disclosure and the cGAN approach are applied.

FIG. 5 shows comparative experimental results of the performance of image translation of corrupted images, when dual autoencoders and image translation methods according to embodiments of the present disclosure and the cGAN approach are applied.

In this experiment, noise (indicated by bold lines) was added at random locations in the sketches (in the first row of FIG. 5) as illustrated in the second row of FIG. 5 and then used as input images. A comparison of reconstructed images shows that the dual autoencoders and image translation methods according to the present disclosure allow for reconstructing higher-quality images than the cGAN approach. It is clear that, while the cGAN approach (in the third row of FIG. 5) reflects the noise added to the input images to the reconstructed images, the dual autoencoder and the image translation method according to the present disclosure successfully removes the corrupted portions.

Figure 6A:
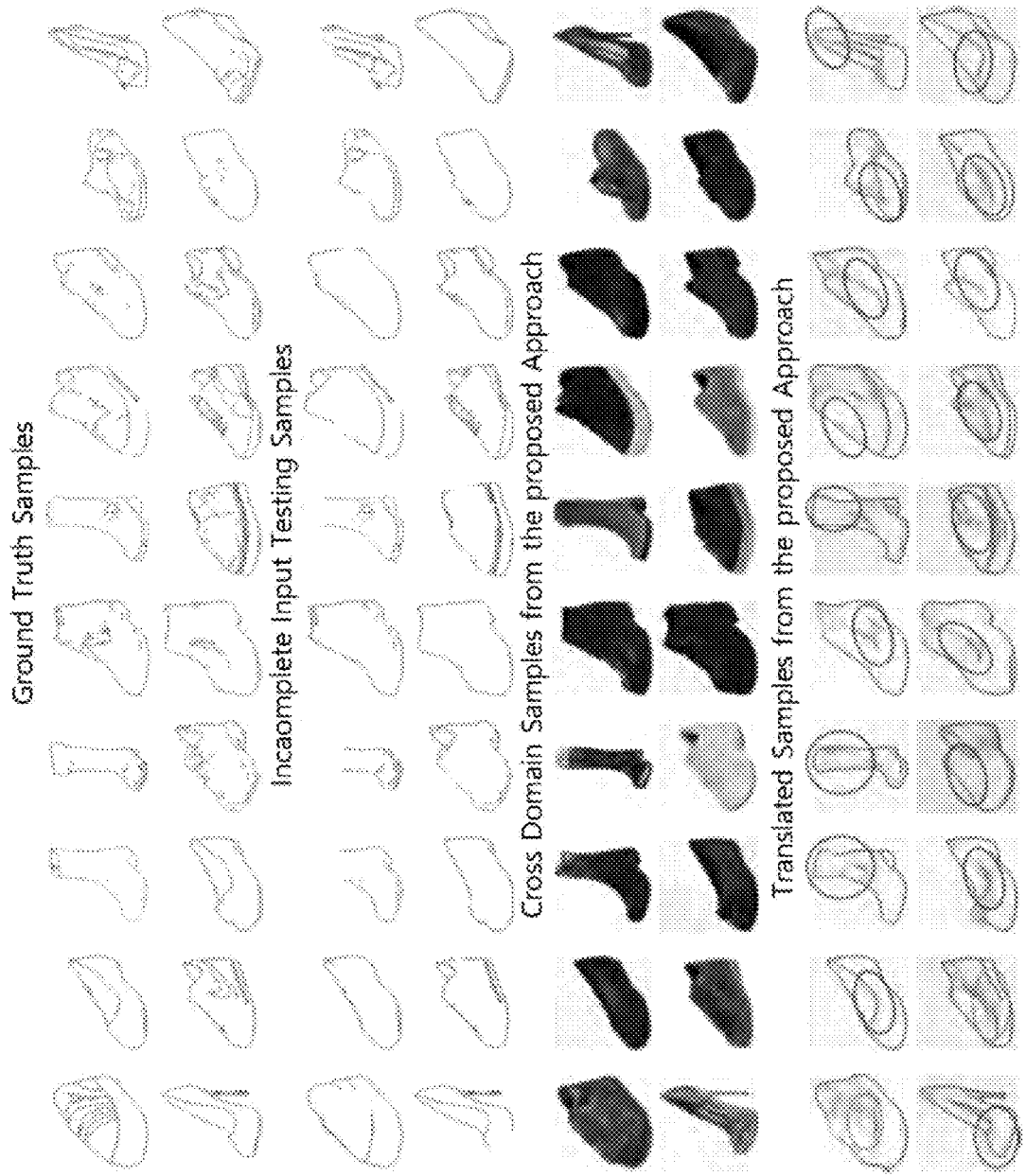
FIGS. 6A and 6B show comparative experimental results of the performance of image completion of partially occluded images, when the dual autoencoder and the image translation method using the same according to the embodiment of the present disclosure and the cGAN approach are applied.
Figure 6B:
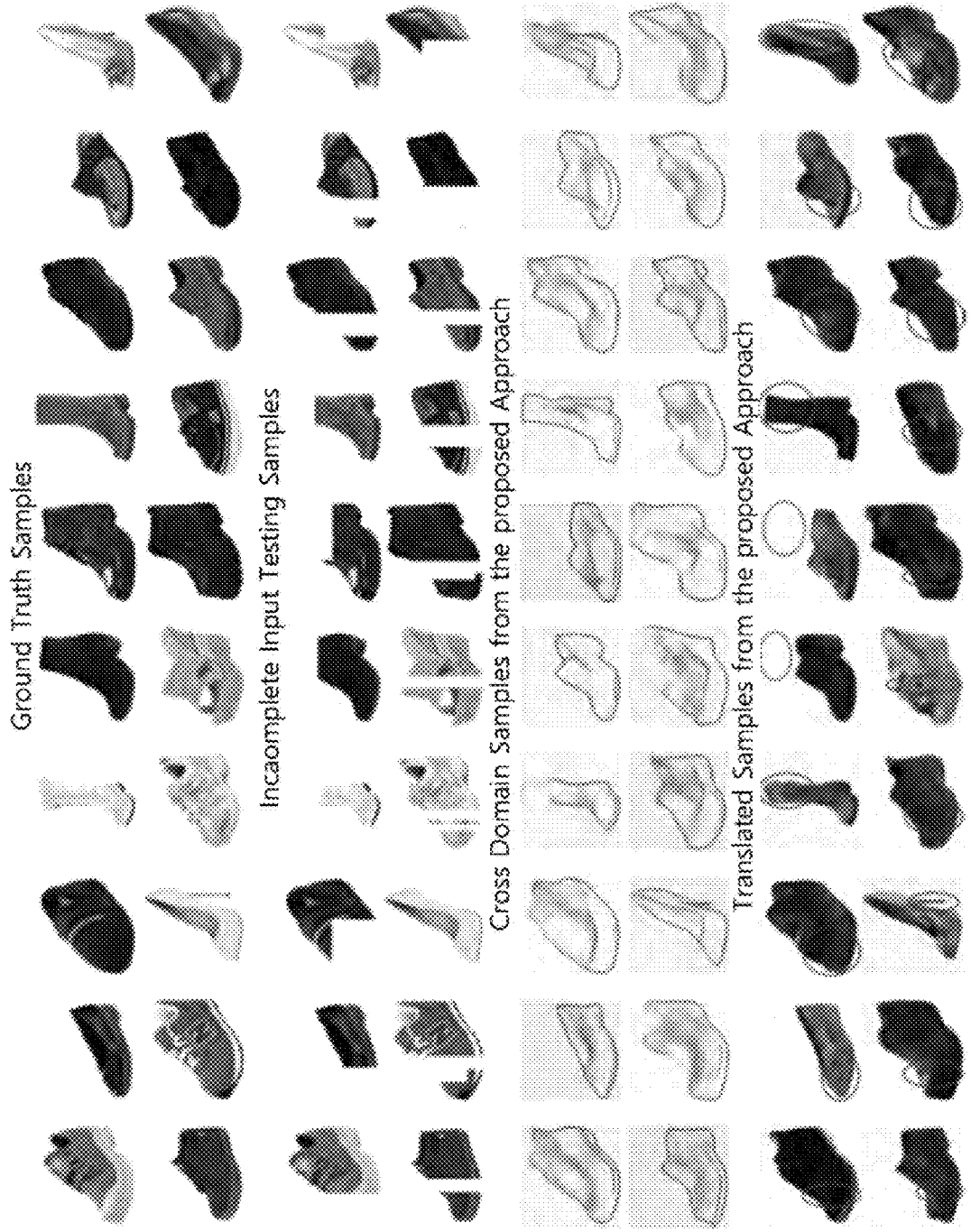

FIGS. 6A and 6B show comparative experimental results of the performance of image completion of partially occluded images, when the dual autoencoder and the image translation method using the same according to the embodiment of the present disclosure and the cGAN approach are applied.

In this experiment, image translation was performed by inputting a partially occluded first domain image into a first autoencoder of a dual autoencoder to obtain a second domain image and then inputting the second domain image into a second autoencoder of the dual autoencoder to reconstruct the first domain image. That is, image translation is performed through the first domain encoder 110, the second domain decoder 170, the second domain encoder 150, and the first domain decoder 130.

FIG. 6A shows experimental results for sketches. FIG. 6B shows experimental results for real images. In FIGS. 6A and 6B, the first and second rows represent ground truth data, the third and fourth rows represent partially occluded input images of the ground truth data, the fifth and sixth rows represent images outputted from the second domain decoder 170, and the seventh and eighth rows represent completed images outputted from the first domain decoder 130. It should be noted that, in the seventh and eighth rows, the recovered mixing pixels and the pixels added by the network are all reflected for image completion. The reason for this is the generality of the dual autoencoder and the image translation method using the same according to the present disclosure. In other words, when the corrupted samples resemble several other samples in the training data, the dual autoencoders tend to generalize the image translation by accommodating those samples.

Figure 7A:
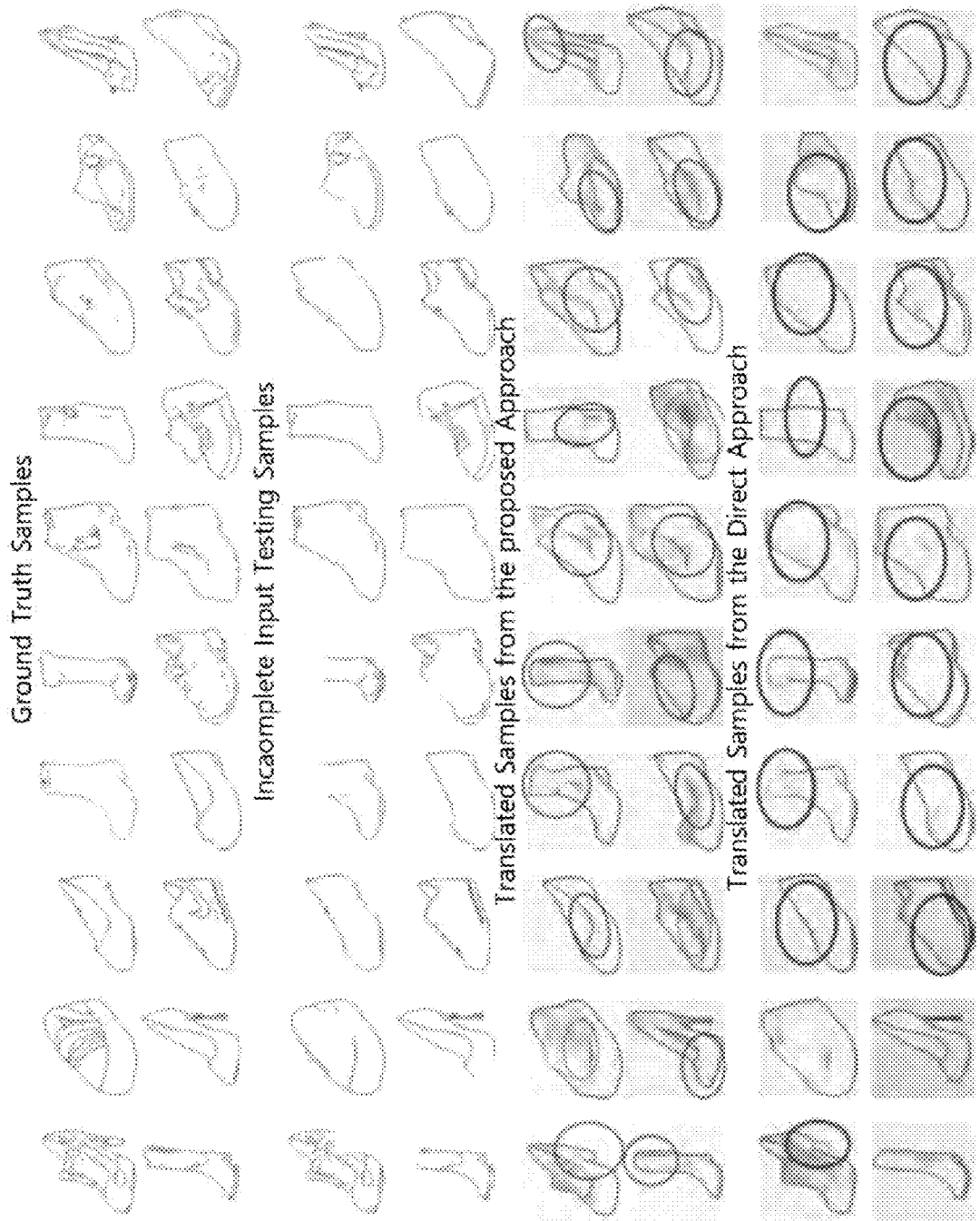
FIGS. 7A and 7B show comparative experimental results of the performance of image completion of partially occluded images, when the dual autoencoder and the image translation method using the same according to the embodiment of the present disclosure and the direct image completion method are applied.
Figure 7B:
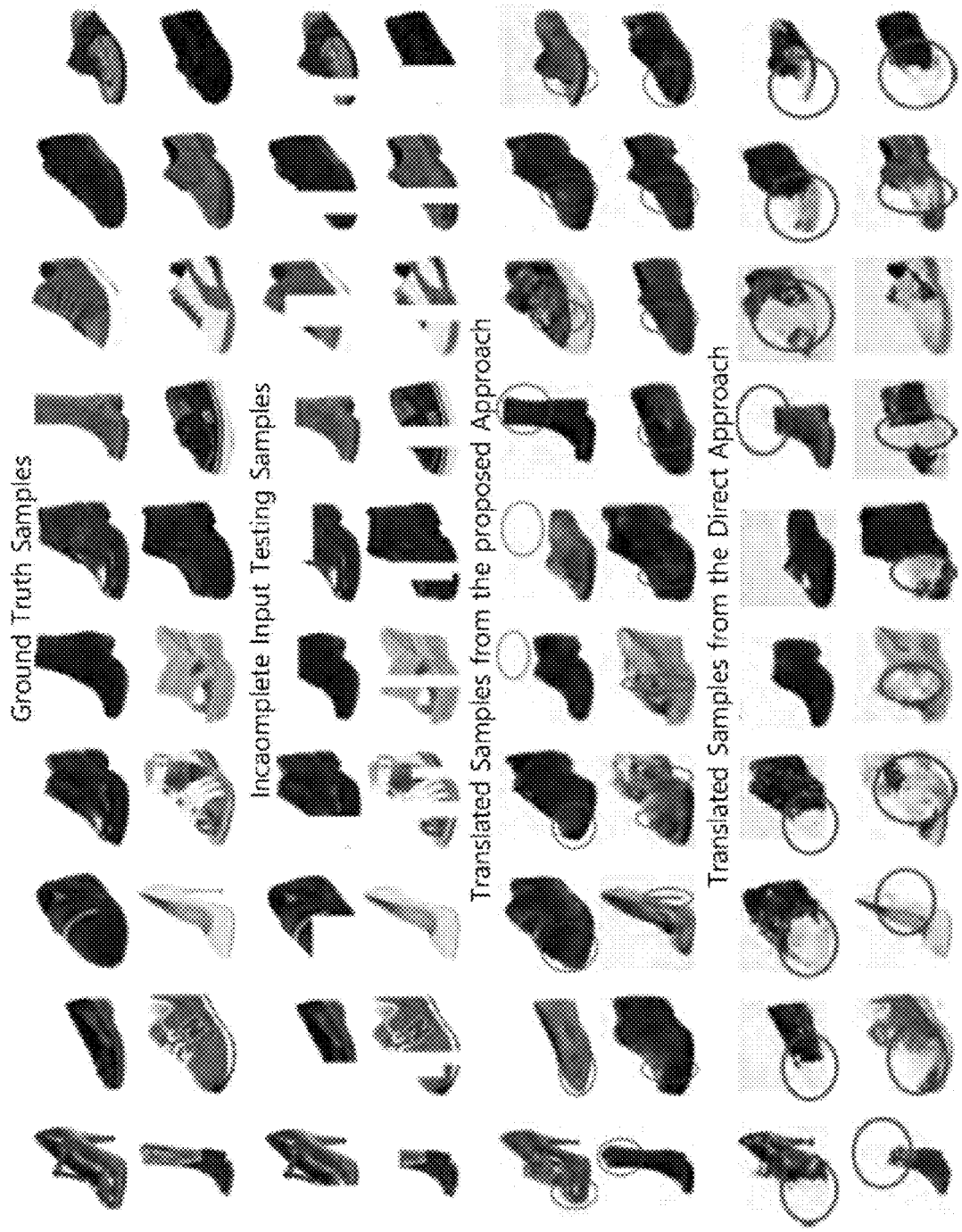

FIGS. 7A and 7B show comparative experimental results of the performance of image completion of partially occluded images, when the dual autoencoder and image translation method using the same according to the embodiment of the present disclosure and the direct image completion method are applied.

In this experiment, the "direct image completion" refers to performing image translation only by using autoencoders without going through the LSAN 190. FIG. 7A shows the experimental results for sketches. FIG. 7B shows the experimental results for real images. In FIGS. 7A and 7B, the first and second rows represent ground truth data, the third and fourth rows represent partially occluded input images of the ground truth data, the fifth and sixth rows represent experimental results obtained by using the above-described image translation method, and the seventh and eighth rows represent experimental results obtained by using the direct image completion method. It should be noted that, although there are some experimental examples in which the direct image completion method produces better results in color representation, the image translation method (using the LSAN) according to the present disclosure produces far better image completion results overall.

FIGS. 8A to 8C are tables showing a quantitative comparison of performance between the dual autoencoder according the embodiment of the present disclosure and the conventional approaches.

FIG. 8A shows the quantitative analysis of the experimental results in FIGS. 3A and 3B based on the mean square error (MSE) from the ground truth. Referring to FIG. 8A, it can be seen that the dual autoencoder according to the present disclosure outperforms the cGAN approach by about 20%.

FIG. 8B shows the quantitative analysis of the experimental results in FIGS. 4A and 4B based on the mean square error (MSE) from the ground truth. Referring to FIG. 8B, it can be seen that the dual autoencoder according to the present disclosure outperforms the cGAN approach by about 20% even when the ground truth data is partially occluded at random locations. Also, it can be seen that the dual autoencoder and the image translation method using the same according to the present disclosure show great capability of recovering the missing parts due to high generality, and that the missing parts are translated into nearby samples even with a high level of occlusion.

FIG. 8C shows evaluation results of the dual autoencoder according to the present disclosure in terms of the mean square error (MSE) and structural similarity index (SSIM) for randomly selected two batches of incomplete images. The structural similarity index (SSIM) is an index showing the structural similarity between the data generated by the network and their corresponding nearby samples. Referring to FIG. 8C, the dual autoencoder of the present disclosure shows a lower means square error (MSE) and a higher structural similarity index (SSIM) than the cGAN approach and autoencoder (AE).

The above-described image translation method using a dual autoencoder according to the present disclosure may be implemented as computer-readable code in a computer-readable recording medium. The computer-readable recording medium includes all kinds of recording media in which data readable by a computer system is stored. Examples of the computer-readable recording medium include a ROM, a RAM, magnetic tape, a magnetic disk, a flash memory, an optical data storage device, and so on. The computer-readable recording medium can be distributed over a computer system connected via a computer network and stored and implemented as code readable in a distributed fashion.

While the present disclosure has been shown and described with reference to the drawing and the embodiments, the scope of the present disclosure is not limited thereto. It will be understood by those skilled in the art that various changes and modifications may be made without departing from the scope of the present disclosure as defined in the following claims.

What is claimed is:

1. A dual autoencoder comprising:
   a first domain encoder for mapping a first domain image into a first latent space;
   a first domain decoder for reconstructing the first domain image;
   a second domain encoder for mapping a second domain image into a second latent space;
   a second domain decoder for reconstructing the second domain image; and
   a latent space association network (LSAN) for defining a cross-domain relationship between a first domain and a second domain,
   wherein:
   the first domain encoder and decoder are trained using the first domain image, and the second domain encoder and decoder are trained using the second domain image, and
   the LSAN is trained after the first domain encoder and decoder, and the second domain encoder and decoder are trained,
   the LSAN is trained in a way that reduces losses between a latent distribution of ground truth and an output of the LSAN, and a combined loss of the LSAN is given by $$L_{LSAN} = q_1(z_1|y_1) - LSAN(q_2(z_2|y_2)) + q_2(z_2|y_2) - LSAN(q_1(z_1|y_1)),$$

and
   where q1(z1|y1) and q2(z2|y2) are outputs of a first autoencoder and a second autoencoder, respectively, and the LSAN is an association between the first latent space and the second latent space.

2. The dual autoencoder of claim 1, wherein the latent space association network (LSAN) defines the cross-domain relationship by mapping between the first latent space and the second latent space.

3. The dual autoencoder of claim 2, wherein the first domain decoder uses different latent spaces as an input according to an output condition, and
   wherein, when the output condition is the same domain, the first domain decoder takes the first latent space as an input, and, when the output condition is a cross domain, the first domain decoder takes the an output of the latent space association network as an input.

4. The dual autoencoder of claim 2, wherein the second domain decoder uses different latent spaces as an input according to an output condition, and wherein, when the output condition is the same domain, the second domain decoder takes the second latent space as an input, and, when the output condition is the cross domain, the second domain decoder takes the output of the latent space association network as an input.

5. The dual autoencoder of claim 1, wherein the first domain encoder and the second domain encoder each include a convolutional layer and a fully connected layer.

6. The dual autoencoder of claim 1, wherein the first domain decoder and the second domain decoder each include a deconvolutional layer and a fully connected layer.

7. The dual autoencoder of claim 1, wherein the latent space association network (LSAN) has a structure of a fully connected association network.

8. An image translation method using a dual encoder, the method comprising:
taking a first domain image as an input;
determining an output condition;
when the output condition is the same domain, reconstructing the first domain image by a first domain encoder and a first domain decoder; and
when the output condition is the cross domain, reconstructing a second domain image by the first domain encoder, a latent space association network (LSAN), and a second domain decoder,
wherein:
the first domain encoder and decoder are trained using the first domain image, and a second domain encoder and the second domain decoder are trained using the second domain image, and
the LSAN is trained after the first domain encoder and decoder, and the second domain encoder and decoder are trained,
the LSAN is trained in a way that reduces losses between a latent distribution of ground truth and an output of the LSAN, and a combined loss of the LSAN is given by $$L_{LSAN} = q_1(z_1|y_1) - LSAN(q_2(z_2|y_2)) + q_2(z_2|y_2) - LSAN(q_1(z_1|y_1)),$$

and
where q1(z1|y1) and q2(z2|y2) are outputs of a first autoencoder and a second autoencoder, respectively, and the LSAN is an association between a first latent space and a second latent space.

9. The image translation method of claim 8, wherein the reconstructing of the first domain image comprises:
mapping the first domain image into the first latent space by the first domain encoder; and
reconstructing the first domain image using the first latent space by the first domain decoder.

10. The image translation method of claim 9, wherein the latent space association network (LSAN) defines the cross-domain relationship by mapping between the first latent space and the second latent space.

11. The image translation method of claim 8, wherein the reconstructing of the first image into a second domain image comprises:
mapping the first domain image into the first latent space by the first domain encoder;
transforming the first latent space to the second latent space by the latent space association network (LSAN); and
reconstructing the second domain image using the second latent space by the second domain decoder.

12. The image translation method of claim 8, wherein the first domain encoder and the second domain encoder each include a convolutional layer and a fully connected layer.

13. The image translation method of claim 8, wherein the first domain decoder and the second domain decoder each include a deconvolutional layer and a fully connected layer.

14. The image translation method of claim 8, wherein the latent space association network (LSAN) has a fully connected association network structure.

15. A non-transitory computer-readable recording medium storing a computer program that performs an image translation method using a dual encoder, the computer program comprising:
an instruction for taking a first domain image as an input;
an instruction for determining an output condition;
an instruction for reconstructing the first domain image by a first domain encoder and a first domain decoder, when the output condition is the same domain; and
an instruction for reconstructing a second domain image by the first domain encoder, a latent space association network (LSAN), and a second domain decoder,
wherein:
the first domain encoder and decoder are trained using the first domain image, a second domain encoder and the second domain decoder are trained using the second domain image, and
the LSAN is trained after the first domain encoder and decoder, and the second domain encoder and decoder are trained,
the LSAN is trained in a way that reduces losses between a latent distribution of ground truth and an output of the LSAN, and a combined loss of the LSAN is given by $$L_{LSAN} = q_1(z_1|y_1) - LSAN(q_2(z_2|y_2)) + q_2(z_2|y_2) - LSAN(q_1(z_1|y_1)),$$

and
where q1(z1|y1) and q2(z2|y2) are outputs of a first autoencoder and a second autoencoder, respectively, and the LSAN is an association between a first latent space and a second latent space.

* * * * *